Patented Sept. 23, 1952

2,611,780

UNITED STATES PATENT OFFICE 2,611,780

BIS-TRIALKYLSILYLPHENOXYSILANES

John L. Speier, Jr., Pittsburgh, Pa., assignor to Dow Corning Corporation, Midland, Mich., a corporation of Michigan No Drawing. Application September 18, 1950, Serial No. 185,515. In Great Britain November 29, 1949

8 Claims. (Cl. 260—448.8)

This invention relates to bis(trialkylsilylphenoxy)-dialkylsilanes.

The compounds of this invention are useful as intermediates in the preparation of bis-phenyloldialkylsilanes. The latter compounds are excellent germicides and useful in the preparation of silylphenol-formaldehyde resins.

This invention relates to compounds of the type

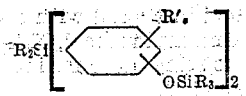

where R is an alkyl radical, R' is alkyl or phenyl and c has a value from 0 to 1.

The above compounds are prepared by reacting a halophenoxysilane of the type

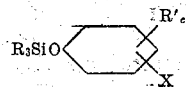

a silane of the type $R_2SiY_2$ and an alkali metal. In these compounds X is a halogen atom and Y is halogen or alkoxy.

The products of this invention may also be prepared by reacting a bis-halophenoxysilane of the type

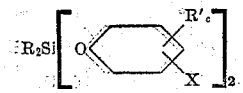

with a silane of the type $R_3SiY$. In this reaction the expected product

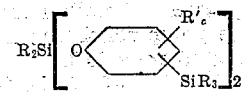

is not obtained. A rearrangement takes place to produce the bis-trialkylsilylphenoxysilanes of this invention. The preparation of compounds of the formula

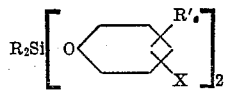

is disclosed in my copending application entitled "Halophenoxysilanes," Serial Number 185,511, filed concurrently herewith.

The reaction is best carried out by adding a mixture of the two silanes to the molten alkali metal. Preferably sodium and potassium are used as the metal. It has been found desirable to carry out the reaction in an inert solvent which will not react with sodium or the silanes.

Such solvents should boil above the melting point of the alkali metal and include, for example, toluene, benzene and alkyl ethers and saturated aliphatic hydrocarbons boiling above 65° C.

After the reaction is complete the reaction mixture is filtered and distilled.

The halophenoxysilanes employed in this invention may or may not contain a substituent hydrocarbon group. It has been found that the R' group may be either saturated aliphatic radicals such as ethyl, methyl, octadecyl and cyclohexyl or phenyl radicals.

The dialkylsilanes may be either dichlorodialkylsilanes or dialkyldialkoxysilanes wherein the alkyl groups are for example methyl, ethyl or octadecyl. It is preferred that the silane not contain both a chlorine and an alkoxy radical.

The above dialkylsilanes are well known, commercially available materials.

The halophenoxysilanes employed in this invention may be prepared by condensing a halophenol of the type

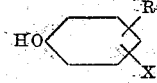

with a trialkylsilane of the type $R_3SiY$ where Y is halogen or alkoxy. In such cases condensation takes place between the phenolic hydroxyl and the silane Y group to produce the phenoxysilane and HCl or an alcohol.

The reaction is accomplished by merely mixing the two ingredients, however, when orthohalophenols are employed, it is best to heat the reaction mixture at a temperature from 100° C. to 150° C. or to employ an HCl acceptor such as pyridine.

The compounds of this invention are useful as heat transfer media and thermo expansion fluids.

The following examples are illustrative only. In the examples, Me is a methyl radical and Et an ethyl radical.

EXAMPLE 1

257 g. of p-chlorophenol, 217 g. of trimethylchlorosilane and 156 g. of pyridine were mixed in toluene, cooled and filtered free of pyridine hydrochloride. The filtrate contained p-chlorophenoxytrimethylsilane. The filtrate was mixed with 129 g. of dimethyldichlorosilane and the mixture was added to 92 g. of molten sodium in boiling toluene. A vigorous reaction occurred. When the reaction was completed, the mixture was filtered and distilled. There was obtained 46 g. of $Me_2Si(p-Me_3SiOC_6H_4-)_2$, boiling point 206° C. at 105 mm.

EXAMPLE 2

A mixture of 168 g. of

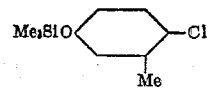

and 52 g. of dichlorodimethylsilane was added to 43 g. of molten sodium in 200 cc. of boiling toluene. The reaction proceeded rapidly and after its completion the reaction mixture was filtered and distilled. There was obtained

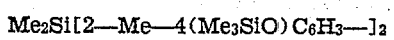

boiling point 252° C. to 276° C. at 1 mm. This product was further identified by hydrolysis to

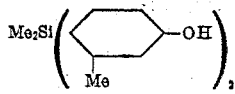

EXAMPLE 3

When bis(orthochlorophenoxy)diethylsilane is mixed with trimethylcholorosilane and the mixture added to molten potassium in boiling benzene a reaction product is $Et_2Si(o-C_6H_4OSiMe_3)_2$, boiling point 235° C. to 246° C. at 24 mm. This compound was obtained rather than the expected $(o-Me_3SiC_6H_4O)_2SiEt_2$ because of rearrangement during the condensation reaction.

EXAMPLE 4

When a mixture of 276.5 grams of 2-phenyl-4-chlorophenoxytrimethylsilane and 64.5 grams of $Me_2SiCl_2$ is reacted with 46 grams of molten sodium by the procedure of Example 2, there is obtained as a reaction product the compound $Me_2Si[3—C_6H_5—4(Me_3SiO)C_6H_3—]_2$.

EXAMPLE 5

A mixture was prepared of 1 molecular equivalent of parabromophenyl and one equivalent of diethoxydimethylsilane. The mixture was heated to distill the ethanol produced and the excess diethoxydimethylsilane. There was thereby obtained dimethylbis-parabromophenoxysilane. A mixture was prepared of 122 grams of this compound and 65 grams of chlorotrimethylsilane. The mixture was added to 30 grams of molten sodium suspended in 200 cc. of boiling toluene containing 10 grams of chlorotrimethylsilane. The mixture was refluxed for one-half hour, following which it was cooled and filtered. Distillation of the reaction product gave the unexpected rearrangement product: $Me_2Si(p-C_6H_4OSiMe_3)_2$.

That which is claimed is:

1. Compounds of the formula

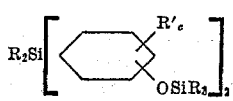

in which R is an alkyl radical, R' is a radical selected from the group consisting of alkyl and phenyl radicals, and c is an integer from 0 to 1 inclusive.

2. Compounds in accord with claim 1 wherein R represents a methyl radical.

3. Compounds in accord with claim 2 wherein R' represents a phenyl radical.

4. Compounds in accord with claim 2 wherein R' represents a methyl radical.

5. The method which comprises reacting a bis-halophenoxy dialkylsilane of the formula

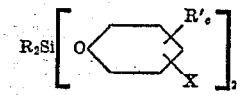

in which R represents an alkyl radical, R' is a radical selected from the group consisting of alkyl and phenyl radicals, X is a halogen atom, and c is an integer of from 0 to 1 inclusive, with a silane of the formula $R_3SiX$ where R and X are as above defined by contacting the two with an alkali metal, whereby the rearrangement product

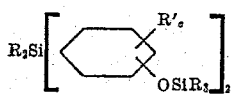

is obtained.

6. The method in acocrd with claim 5 wherein R represents a methyl radical, X is selected from the group consisting of chlorine and bromine atoms, and c equals 0.

7. The method which comprises reacting a bis-halophenoxydialkylsilane of the formula

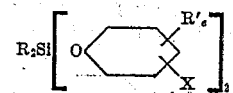

in which R represents an alkyl radical, R' is a radical selected from the group consisting of alkyl and phenyl radicals, X is a halogen atom, and c is an integer of from 0 to 1 inclusive, with a silane of the formula $R_3SiX$, where R and X are as above defined, by contacting the two in liquid phase with a molten alkali metal, whereby the rearrangement product

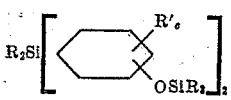

is obtained.

8. The method in accordance with claim 7 wherein R represents a methyl radical, X is selected from the group consisting of chlorine and bromine atoms, and c equals 0.

JOHN L. SPEIER, JR.

No references cited.